US012781048B2

(12) United States Patent
Chen et al.

(10) Patent No.: US 12,781,048 B2
(45) Date of Patent: Nov. 3, 2026

(54) POLY(PHENYLENE ETHER)-BASED COMPOSITION AND ARTICLE

(71) Applicant: SHPP GLOBAL TECHNOLOGIES B.V., Bergen op Zoom (NL)

(72) Inventors: Haiming Chen, Shanghai (CN); Shijie Song, Shanghai (CN); Yapeng Fang, Shanghai (CN)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 433 days.

(21) Appl. No.: 18/290,933

(22) PCT Filed: May 27, 2022

(86) PCT No.: PCT/IB2022/055035

§ 371 (c)(1),
(2) Date: Jan. 22, 2024

(87) PCT Pub. No.: WO2023/037172

PCT Pub. Date: Mar. 16, 2023

(65) Prior Publication Data

US 2024/0352252 A1 Oct. 24, 2024

(30) Foreign Application Priority Data

Sep. 13, 2021 (EP) .................................... 21196306

(51) Int. Cl.

*C08L 71/12* (2006.01)
*C08K 5/521* (2006.01)

(52) U.S. Cl.

CPC ............ *C08L 71/123* (2013.01); *C08K 5/521* (2013.01); *C08L 2201/02* (2013.01)

(58) Field of Classification Search

CPC .... C08L 71/123; C08L 2201/02; C08L 25/06; C08L 27/18; C08L 53/025; C08K 5/521; C08K 5/523; C08K 2003/2241; B29C 45/0001

See application file for complete search history.

(56) References Cited

U.S. PATENT DOCUMENTS

| | | | | |
|---|---|---|---|---|
| 4,355,126 | A | 10/1982 | Haaf et al. | |
| 4,532,281 | A * | 7/1985 | Lee, Jr. ................. | C08L 71/123 524/508 |
| 8,017,697 | B2 | 9/2011 | Carrillo et al. | |
| 8,669,332 | B2 | 3/2014 | Carrillo et al. | |
| 2004/0063824 | A1 | 4/2004 | Takagi et al. | |
| 2011/0152431 | A1 * | 6/2011 | Elkovitch ............... | C08L 77/06 524/505 |
| 2012/0302679 | A1 | 11/2012 | Lietzau et al. | |
| 2012/0329961 | A1 | 12/2012 | Carrillo et al. | |
| 2014/0045979 | A1 * | 2/2014 | Ziegler ................... | C08L 23/00 524/127 |

FOREIGN PATENT DOCUMENTS

| | | | | |
|---|---|---|---|---|
| CN | 103232702 | A | | 8/2013 |
| CN | 105062035 | A | | 11/2015 |
| EP | 2617772 | A1 | | 7/2013 |
| KR | 2003006795 | A | * | 1/2003 |
| KR | 100405198 | B1 | | 11/2003 |
| WO | WO-9014386 | A | * | 11/1990 |

OTHER PUBLICATIONS

Machine translation of KR-100405198 (Year: 2003).*

International Search Report and Written Opinion for the corresponding International Application No. PCT/IB2022/055035, International Filing Date: May 27, 2022, Date of Mailing: Aug. 30, 2022; 10 pages.

International Preliminary Report on Patentability for the corresponding International Application No. PCT/IB2022/055035; International Filing Date: May 27, 2022; Date of Mailing: Mar. 28, 2024; 6 pages.

* cited by examiner

*Primary Examiner* — Doris L Lee

(74) *Attorney, Agent, or Firm* — Samantha Page; Stites & Harbison, PLLC

(57) ABSTRACT

A poly(phenylene ether)-based composition exhibiting improved resistance to decomposition after repeated exposure to high voltages is prepared by melt-blending specific amounts of a poly(phenylene ether), an organophosphate ester flame retardant, and a surface energy reducing agent. The composition includes no more than 30 weight percent of mineral filler. Also described is an injection molded article prepared from the composition.

15 Claims, No Drawings

POLY(PHENYLENE ETHER)-BASED COMPOSITION AND ARTICLE

CROSS-REFERENCE TO RELATED APPLICATIONS

This application is a National Stage application of PCT/JB2022/055035, filed May 27, 2022. which claims the benefit of EP application Ser. No. 21/196,306.1, filed on Sep. 13, 2021, both of which are which-is-incorporated by reference herein in is their entirety.

BACKGROUND OF THE INVENTION

Poly(phenylene ether) is a type of plastic known for its excellent water resistance, dimensional stability, and inherent flame retardancy. Properties such as strength, stiffness, chemical resistance, and heat resistance can be tailored by blending poly(phenylene ether) with various other plastics in order to meet the requirements of a wide variety of consumer and industrial products including, for example, components of commercial appliances, home appliances, photovoltaic systems, and automotive systems. However, particularly for product applications with exposure to high voltages, there remains a need for poly(phenylene ether)-based compositions exhibiting improved high voltage tracking resistance, that is, improved resistance to decomposition after repeated exposure to high voltages.

BRIEF SUMMARY OF EMBODIMENTS OF THE INVENTION

One embodiment is a melt-blended composition comprising the product of melt-blending a pre-blended composition comprising, based on the total weight of the pre-blended composition: 43 to 87 weight percent of a poly(phenylene ether); 10 to 20 weight percent of an organophosphate ester flame retardant; 6 to 22 weight percent of a surface energy reducing agent selected from the group consisting of polytrifluoroethylenes, polytetrafluoroethylenes, polyhexafluoropropylenes, tetrafluoroethylene-hexafluoropropylene copolymers, poly(vinyl fluoride)s, poly(vinylidene fluoride)s, polychlorotrifluoroethylenes, polydimethylsiloxanes, silicone oils, paraffins, and combinations thereof; and 0 to 30 weight percent of mineral filler.

Another embodiment is an injection molded article comprising the composition in any of its variations described herein.

These and other embodiments are described in detail below.

DETAILED DESCRIPTION OF THE INVENTION

The present inventors have determined that improved high voltage tracking resistance is exhibited by a composition comprising specific amounts of a poly(phenylene ether), an organophosphate ester flame retardant, and a surface energy reducing agent, wherein the composition contains no more than 30 weight percent of mineral filler.

Thus, one embodiment is a melt-blended composition comprising the product of melt-blending a pre-blended composition comprising, based on the total weight of the pre-blended composition: 43 to 87 weight percent of a poly(phenylene ether); 10 to 20 weight percent of an organophosphate ester flame retardant; 6 to 22 weight percent of a surface energy reducing agent selected from the group consisting of polytrifluoroethylenes, polytetrafluoroethylenes, polyhexafluoropropylenes, tetrafluoroethylene-hexafluoropropylene copolymers, poly(vinyl fluoride)s, poly(vinylidene fluoride)s, polychlorotrifluoroethylenes, polydimethylsiloxanes, silicone oils, paraffins, and combinations thereof; and 0 to 30 weight percent of mineral filler.

The melt-blended composition is described as comprising the product of melt-blending a pre-blended composition comprising various components. This description is used because the chemical and/or physical nature of the components in the pre-blended composition may change on melt blending. For example, the molecular weight distribution of the poly(phenylene ether) may change on melt blending. As another example, if the surface energy reducing agent is provided in the form of particles, the shape and size of the particles may change on melt blending.

The pre-blended composition comprises a poly(phenylene ether). A poly(phenylene ether) is a polymer comprising repeating structural units having the formula

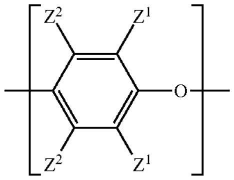

wherein each occurrence of $Z^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Z^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it may, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst.

The poly(phenylene ether) can comprise molecules having aminoalkyl-containing end group(s), typically located in a position ortho to the hydroxyl group. Also frequently present are tetramethyldiphenoquinone (TMDQ) end groups, typically obtained from 2,6-dimethylphenol-containing reaction mixtures in which tetramethyldiphenoquinone by-product is present. The poly(phenylene ether) can be in the form of a homopolymer, a copolymer, a graft copolymer, an ionomer, or a block copolymer, as well as combinations thereof. In some embodiments, the poly(phenylene ether) comprises a poly(2,6-dimethyl-1,4-phenylene ether).

In some embodiments, the poly(phenylene ether) comprises a poly(phenylene ether)-polysiloxane block copolymer. As used herein, the term "poly(phenylene ether)-polysiloxane block copolymer" refers to a block copolymer comprising at least one poly(phenylene ether) block and at least one polysiloxane block.

In some embodiments, the poly(phenylene ether)-polysiloxane block copolymer is prepared by an oxidative copolymerization method. In this method, the poly(phenylene ether)-polysiloxane block copolymer is the product of a process comprising oxidatively copolymerizing a monomer mixture comprising a monohydric phenol and a hydroxyaryl-terminated polysiloxane. In some embodiments, the monomer mixture comprises 70 to 99 parts by weight of the monohydric phenol and 1 to 30 parts by weight of the hydroxyaryl-terminated polysiloxane, based on the total weight of the monohydric phenol and the hydroxyaryl-terminated polysiloxane. The hydroxyaryl-diterminated polysiloxane can comprise a plurality of repeating units having the structure

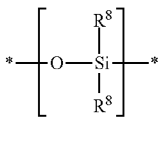

wherein each occurrence of $R^8$ is independently hydrogen, $C_1$-$C_{12}$ hydrocarbyl or $C_1$-$C_{12}$ halohydrocarbyl; and two terminal units having the structure

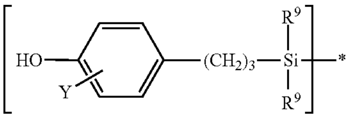

wherein Y is hydrogen, $C_1$-$C_{12}$ hydrocarbyl, $C_1$-$C_{12}$ hydrocarbyloxy, or halogen, and wherein each occurrence of $R^9$ is independently hydrogen, $C_1$-$C_{12}$ hydrocarbyl or $C_1$-$C_{12}$ halohydrocarbyl. In a very specific embodiment, each occurrence of $R^8$ and $R^9$ is methyl, and Y is methoxyl.

In some embodiments, the monohydric phenol comprises 2,6-dimethylphenol, and a hydroxyaryl-terminated polysiloxane having the structure

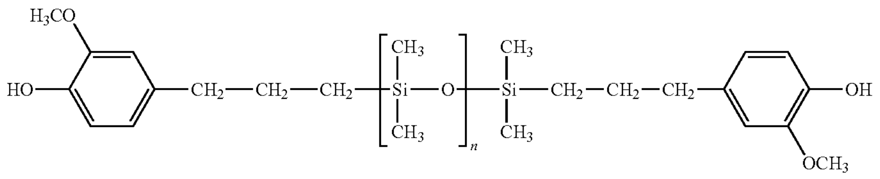

wherein n is, on average, 5 to 100, specifically 30 to 60.

The oxidative copolymerization method produces poly(phenylene ether)-polysiloxane block copolymer as the desired product and poly(phenylene ether) (without an incorporated polysiloxane block) as a by-product. It is not necessary to separate the poly(phenylene ether) from the poly(phenylene ether)-polysiloxane block copolymer. The poly(phenylene ether)-polysiloxane block copolymer can thus be utilized as a "reaction product" that includes both the poly(phenylene ether) and the poly(phenylene ether)-polysiloxane block copolymer. Certain isolation procedures, such as precipitation from isopropanol, make it possible to assure that the reaction product is essentially free of residual hydroxyaryl-terminated polysiloxane starting material. In other words, these isolation procedures assure that the polysiloxane content of the reaction product is essentially all in the form of poly(phenylene ether)-polysiloxane block copolymer. Detailed methods for forming poly(phenylene ether)-polysiloxane block copolymers are described in U.S. Pat. No. 8,017,697 to Carrillo et al . . . and U.S. Patent Application Publication No. US 2012/0329961 A1 of Carrillo et al.

In some embodiments, the poly(phenylene ether) has an intrinsic viscosity of 0.25 to 0.6 deciliter per gram, measured at 25° C. in chloroform by Ubbelohde viscometer. Within this range, the intrinsic viscosity can be 0.3 to 0.55 deciliter per gram, 0.35 to 0.5 deciliter per gram, or 0.35 to 0.45 deciliter per gram.

The pre-blended composition comprises the poly(phenylene ether) in an amount of 43 to 87 weight percent, based on the total weight of the pre-blended composition. Within this range, the poly(phenylene ether) amount can be 43 to 85 weight percent, or 50 to 80 weight percent, or 50 to 75 weight percent, or 55 to 70 weight percent, or 60 to 70 weight percent.

In addition to the poly(phenylene ether), the pre-blended composition comprises an organophosphate ester flame retardant. Exemplary organophosphate ester flame retardants include phosphate esters comprising phenyl groups, substituted phenyl groups, or a combination of phenyl groups and substituted phenyl groups, bis-aryl phosphate esters based upon resorcinol such as, for example, resorcinol bis(diphenyl phosphate), as well as those based upon bis-phenols such as, for example, bisphenol A bis(diphenyl phosphate). In some embodiments, the organophosphate ester is selected from tris(alkylphenyl) phosphates (for example, CAS Reg. No. 89492-23-9 or CAS Reg. No. 78-33-1), resorcinol bis(diphenyl phosphate) (CAS Reg. No.

57583-54-7), bisphenol A bis(diphenyl phosphate) (CAS Reg. No. 181028-79-5), triphenyl phosphate (CAS Reg. No. 115-86-6), tris(isopropylphenyl) phosphates (for example, CAS Reg. No. 68937-41-7), t-butylphenyl diphenyl phosphates (CAS Reg. No. 56803-37-3), bis(t-butylphenyl) phenyl phosphates (CAS Reg. No. 65652-41-7), tris(t-butylphenyl) phosphates (CAS Reg. No. 78-33-1), and combinations thereof.

In some embodiments the organophosphate ester comprises a bis-aryl phosphate having the formula

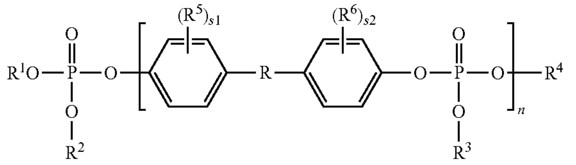

wherein R is independently at each occurrence a $C_1$-$C_{12}$ alkylene group; $R^5$ and $R^6$ are independently at each occurrence a $C_1$-$C_5$ alkyl group; $R^1$, $R^2$, and $R^4$ are independently a $C_1$-$C_{12}$ hydrocarbyl group; $R^3$ is independently at each occurrence a $C_1$-$C_{12}$ hydrocarbyl group; n is 1 to 25; and s1 and s2 are independently an integer equal to 0, 1, or 2. In some embodiments $OR^1$, $OR^2$, $OR^3$ and $OR^4$ are independently derived from phenol, a monoalkylphenol, a dialkylphenol, or a trialkylphenol.

As readily appreciated by one of ordinary skill in the art, the bis-aryl phosphate is derived from a bisphenol. Exemplary bisphenols include 2,2-bis(4-hydroxyphenyl) propane (bisphenol A), 2,2-bis(4-hydroxy-3-methylphenyl)propane, bis(4-hydroxyphenyl)methane, bis(4-hydroxy-3,5-dimethylphenyl) methane and 1,1-bis(4-hydroxyphenyl)ethane. In some embodiments, the bisphenol comprises bisphenol A.

In some embodiments, the organophosphate ester is selected from the group consisting of triaryl phosphates (including triphenyl phosphate, tritolyl phosphate, tris(isopropylphenyl) phosphates, tris(tert-butylphenyl) phosphates, and combinations thereof), dihydroxyphenyl bis (diaryl phosphates) (including resorcinol bis(diphenyl phosphate)), bisphenol bis(diaryl phosphates) (including bisphenol A bis(diphenyl phosphate)), and combinations thereof. In some embodiments, the organophosphate ester comprises bisphenol A bis(diphenyl phosphate).

The pre-blended composition comprises the organophosphate ester flame retardant in an amount of 10 to 20 weight percent, based on the total weight of the pre-blended composition. Within this range, the organophosphate ester flame retardant amount can be 10 to 18 weight percent, or 11 to 18 weight percent, or 12 to 16 weight percent.

In addition to the poly(phenylene ether) and the organophosphate ester flame retardant, the pre-blended composition comprises a surface energy reducing agent. A surface energy reducing agent is an additive that reduces the surface energy of an article prepared from a composition with the surface energy reducing agent, relative to the surface energy of an article prepared from a composition without the surface energy reducing agent. In the working examples below, higher water contact angles correspond to lower surface energies. Suitable surface energy reducing agents include, for example, polytrifluoroethylenes, polytetrafluoroethylenes, polyhexafluoropropylenes, tetrafluoroethylene-hexafluoropropylene copolymers, poly(vinyl fluoride)s, poly(vinylidene fluoride)s, polychlorotrifluoroethylenes, polydimethylsiloxanes, silicone oils, paraffins, and combinations thereof. In some embodiments, the surface energy reducing agent is selected from the group consisting of polytrifluoroethylenes, polytetrafluoroethylenes, polyhexafluoropropylenes, tetrafluoroethylene-hexafluoropropylene copolymers, poly(vinyl fluoride)s, poly(vinylidene fluoride)s, polychlorotrifluoroethylenes, and combinations thereof. In some embodiments, the surface energy reducing agent comprises polytetrafluoroethylene. It will be understood that the term "surface energy reducing agent" does not include materials in which one of the species above is encapsulated with a different polymer that is not one of the species above. For example, the term "surface energy reducing agent" does not include polytetrafluoroethylene encapsulated in styrene-acrylonitrile copolymer (also known as "TSAN").

In some embodiments, the surface energy reducing agent is in the form of particles having a volume-based median equivalent spherical diameter of 100 nanometers to 200 micrometers determined by laser diffraction according to ISO 13320:2009. Within this range, the volume-based median equivalent spherical diameter of the surface energy reducing agent can be 100 nanometers to 100 micrometers, or 100 nanometers to 50 micrometers, or 100 nanometers to 25 micrometers, or 200 nanometers to 25 micrometers. In some variations of this embodiment, the surface energy reducing agent comprises tetrafluoroethylene.

The pre-blended composition comprises the surface energy reducing agent in an amount of 3 to 25 weight percent, based on the total weight of the pre-blended composition. Within this range, the surface energy reducing agent amount can be 5 to 25 weight percent, or 6 to 22 weight percent, or 6 to 15 weight percent, or 8 to 15 weight percent, or 8 to 12 weight percent.

The pre-blended composition comprises 0 to 30 weight percent of mineral filler. In other words, the pre-blended composition can comprise no mineral filler, or some mineral filler as long as the amount of mineral filler is no more than 30 weight percent of the total weight of the pre-blended composition. Mineral fillers include, for example, talc, clay, zinc oxide, titanium dioxide, barium sulfate, calcium carbonate, zine sulfide, and combinations thereof. Within the range of 0 to 30 weight percent, the amount of mineral filler can be 10 to 30 weight percent, or 15 to 25 weight percent, or 0 to 5 weight percent, or 0 to 1 weight percent, or zero weight percent. In some embodiments, the pre-blended composition comprises 10 to 30 weight percent of the mineral filler, and the mineral filler comprises titanium dioxide. In other embodiments, the pre-blended composition comprises no more than 5 weight percent of the mineral filler, or no more than 1 weight percent of the mineral filler, or zero weight percent of the mineral filler.

The pre-blended composition can, optionally, further comprise a brominated flame retardant. Suitable brominated flame retardants include, for example, brominated polystyrenes, brominated epoxy resins, decabromodiphenyl ether, tetrabromobisphenol A, decabromodiphenylethane, and combinations thereof. In some embodiments, the brominated flame retardant comprises a brominated polystyrene. When present, the brominated flame retardant can be used in an amount of 2 to 18 weight percent, based on the total weight of the pre-blended composition. Within this range, the brominated flame retardant amount can be 2 to 15 weight percent, or 2 to 12 weight percent, or 2 to 10 weight percent, or 3 to 10 weight percent, or 4 to 10 weight percent.

The pre-blended composition can, optionally, further comprise a styrenic polymer selected from the group consisting of polystyrenes, rubber-modified polystyrenes, hydrogenated block copolymers of an alkenyl aromatic compound and a conjugated diene, and combinations thereof. In some embodiments, the styrenic polymer comprises a hydrogenated block copolymers of an alkenyl aromatic compound and a conjugated diene. For brevity, this component is referred to as the "hydrogenated block copolymer". The hydrogenated block copolymer may comprise about 10 to about 90 weight percent of poly(alkenyl aromatic) content and about 90 to about 10 weight percent of hydrogenated poly(conjugated diene) content, based on the weight of the hydrogenated block copolymer. In some embodiments, the poly(alkenyl aromatic) content is about 10 to about 45 weight percent, or about 20 to about 40 weight percent, or about 25 to about 35 weight percent. In other embodiments, the poly(alkenyl aromatic) content is about 45 weight percent to about 90 weight percent, or about 45 to about 80 weight percent. The hydrogenated block copolymer can have a weight average molecular weight of about 40,000 to about 400,000 atomic mass units. The number average molecular weight and the weight average molecular weight may be determined by gel permeation chromatography and based on comparison to polystyrene standards. In some embodiments, the hydrogenated block copolymer has a weight average molecular weight of about 200,000 to about 400,000 atomic mass units, or about 220,000 to about 350,000 atomic mass units. In other embodiments, the hydrogenated block copolymer can have a weight average molecular weight of about 40,000 to about 200.000 atomic mass units, or about 40,000 to about 180,000 atomic mass units, or about 40,000 to about 150,000 atomic mass units.

The alkenyl aromatic monomer used to prepare the hydrogenated block copolymer can have the structure

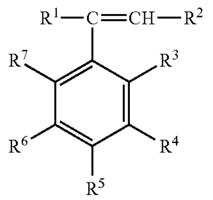

wherein $R^1$ and $R^2$ each independently represent a hydrogen atom, a $C_1$-$C_8$ alkyl group, or a $C_2$-$C_8$ alkenyl group; $R^3$ and $R^7$ each independently represent a hydrogen atom, a $C_1$-$C_8$ alkyl group, a chlorine atom, or a bromine atom; and $R^4$, $R^5$, and $R^6$ each independently represent a hydrogen atom, a $C_1$-$C_8$ alkyl group, or a $C_2$-$C_8$ alkenyl group, or $R^4$ and $R^5$ are taken together with the central aromatic ring to form a naphthyl group, or $R^5$ and $R^6$ are taken together with the central aromatic ring to form a naphthyl group. Specific alkenyl aromatic monomers include, for example, styrene, chlorostyrenes such as p-chlorostyrene, and methylstyrenes such as alpha-methylstyrene and p-methylstyrene. In some embodiments, the alkenyl aromatic monomer is styrene.

The conjugated diene used to prepare the hydrogenated block copolymer can be a $C_4$-$C_{20}$ conjugated diene. Suitable conjugated dienes include, for example, 1,3-butadiene, 2-methyl-1,3-butadiene, 2-chloro-1,3-butadiene, 2,3-dimethyl-1,3-butadiene, 1,3-pentadiene, 1,3-hexadiene, and the like, and combinations thereof. In some embodiments, the conjugated diene is 1,3-butadiene, 2-methyl-1,3-butadiene, or a combination thereof. In some embodiments, the conjugated diene consists of 1,3-butadiene.

The hydrogenated block copolymer is a copolymer comprising (A) at least one block derived from an alkenyl aromatic compound and (B) at least one block derived from a conjugated diene, in which the aliphatic unsaturated group content in the block (B) is at least partially reduced by hydrogenation. In some embodiments, the aliphatic unsaturation in the (B) block is reduced by at least 50 percent, or at least 70 percent. The arrangement of blocks (A) and (B) includes a linear structure, a grafted structure, and a radial teleblock structure with or without a branched chain. Linear block copolymers include tapered linear structures and non-tapered linear structures. In some embodiments, the hydrogenated block copolymer has a tapered linear structure. In some embodiments, the hydrogenated block copolymer has a non-tapered linear structure. In some embodiments, the hydrogenated block copolymer comprises a B block that comprises random incorporation of alkenyl aromatic monomer. Linear block copolymer structures include diblock (A-B block), triblock (A-B-A block or B-A-B block), tetrablock (A-B-A-B block), and pentablock (A-B-A-B-A block or B-A-B-A-B block) structures as well as linear structures containing 6 or more blocks in total of A and B, wherein the molecular weight of each A block may be the same as or different from that of other A blocks, and the molecular weight of each B block may be the same as or different from that of other B blocks. In some embodiments, the hydrogenated block copolymer is a diblock copolymer, a triblock copolymer, or a combination thereof.

In some embodiments, the hydrogenated block copolymer excludes the residue of monomers other than the alkenyl aromatic compound and the conjugated diene.

In some embodiments, the hydrogenated block copolymer comprises a polystyrene-poly(ethylene-butylene)-polystyrene triblock copolymer. In some embodiments, the hydrogenated block copolymer comprises a polystyrene-poly(ethylene-butylene)-polystyrene triblock copolymer having a weight average molecular weight of about 200,000 to about 400,000 atomic mass units, or about 240,000 to about 350,000 atomic mass units, or about 240,000 to about 300.000 atomic mass units.

Methods for preparing hydrogenated block copolymers are known in the art and many hydrogenated block copolymers are commercially available. Illustrative commercially available hydrogenated block copolymers include the polystyrene-poly(ethylene-propylene) diblock copolymers available from Kraton Polymers as KRATON G1701 and G1702; the polystyrene-poly(ethylene-butylene)-polystyrene triblock copolymers available from Kraton Polymers as KRATON G1641, G1650, G1651, G1654, G1657, G1726, G4609, G4610, GRP-6598. RP-6924, MD-6932M, MD-6933, and MD-6939; the polystyrene-poly(ethylene-butylene-styrene)-polystyrene (S-EB/S-S) triblock copolymers available from Kraton Polymers as KRATON RP-6935 and RP-6936, the polystyrene-poly(ethylene-propylene)-polystyrene triblock copolymers available from Kraton Polymers as KRATON G1730; the maleic anhydride-grafted polystyrene-poly(ethylene-butylene)-polystyrene triblock copolymers available from Kraton Polymers as KRATON G1901, G1924, and MD-6684; the maleic anhydride-grafted polystyrene-poly(ethylene-butylene-styrene)-polystyrene triblock copolymer available from Kraton Polymers as KRATON MD-6670; the polystyrene-poly(ethylene-butylene)-polystyrene triblock copolymer comprising 67 weight percent polystyrene available from Asahi Kasei Elastomer as TUFTEC H1043; the polystyrene-poly(ethylene-butylene)-polystyrene triblock copolymer comprising 42 weight percent polystyrene available from Asahi Kasei Elastomer as TUFTEC H1051; the polystyrene-poly(butadiene-butylene)-polystyrene triblock copolymers available from Asahi Kasei Elastomer as TUFTEC P1000 and P2000; the polystyrene-polybutadiene-poly(styrene-butadiene)-polystyrene block copolymer available from Asahi Kasei Elastomer as S.O.E.-SS L601; the hydrogenated radial block copolymers available from Chevron Phillips Chemical Company as K-Resin KK38, KR01, KR03, and KR05; the polystyrene-poly(ethylene-butylene)-polystyrene triblock copolymer comprising 60 weight polystyrene available from Kuraray as SEPTON S8104; the polystyrene-poly(ethylene-ethylene/propylene)-polystyrene triblock copolymers available from Kuraray as SEPTON S4044, S4055, S4077, and S4099; and the polystyrene-poly(ethylene-propylene)-polystyrene triblock copolymer comprising 65 weight percent polystyrene available from Kuraray as SEPTON S2104. Mixtures of two of more hydrogenated block copolymers can be used.

When present, the styrenic polymer is used in an amount of 2 to 15 weight percent, based on the total weight of the pre-blended composition. Within this range, the styrenic polymer amount can be 2 to 12 weight percent, or 2 to 10 weight percent, or 2 to 8 weight percent, or 2 to 6 weight percent.

The pre-blended composition can, optionally, further comprise one or more additives known in the thermoplastics art. For example, the composition can, optionally, further comprise an additive selected from the group consisting of stabilizers, mold release agents, lubricants, processing aids, drip retardants, nucleating agents, UV blockers, colorants (including dyes and pigments), antioxidants, anti-static agents, blowing agents, mineral oil, metal deactivators, antiblocking agents, and combinations thereof. When present, such additives are typically used in a total amount of less than or equal to 10 weight percent, or less than or equal to 5 weight percent, or less than or equal to 1 weight percent, or less than or equal to 0.5 weight percent, based on the total weight of the pre-blended composition.

In a very specific embodiment of the melt-blended composition, the pre-blended composition comprises 52 to 80 weight percent of the poly(phenylene ether), 10 to 18 weight percent of the organophosphate ester flame retardant, 6 to 15 weight percent of the surface energy reducing agent, and 0 to 5 weight percent of the mineral filler; the pre-blended composition further comprises 2 to 10 weight percent of a brominated polystyrene; the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof; the poly(phenylene ether) comprises a poly(2,6-dimethyl-1,4-phenylene ether) having an intrinsic viscosity of 0.36 to 0.44 deciliter per gram; and the surface energy reducing agent is polytetrafluoroethylene. In some variations of this specific embodiment, the polytetrafluoroethylene is in the form of particles having a volume-based median equivalent spherical diameter of 100 nanometers to 25 micrometers determined by laser diffraction according to ISO 13320:2009. In some variations of this specific embodiment, the organophosphate ester flame retardant comprises bisphenol A bis(diphenyl phosphate). In some variation of this specific embodiment, the styrenic polymer is a hydrogenated block copolymer of an alkenyl aromatic compound and a conjugated diene. In some variations of this specific embodiment, the total amounts of the poly(phenylene ether), the organophosphate flame retardant, the surface energy reducing agent, the mineral filler, the brominated polystyrene, and the styrenic polymer is 95 to 100 weight percent, or 98 to 100 weight percent, or 99 to 100 weight percent, or 99.5 to 100 weight percent, based on the total weight of the pre-blended composition.

In another very specific embodiment of the melt-blended composition, the pre-blended composition comprises 43 to 72 weight percent of the poly(phenylene ether), 10 to 18 weight percent of the organophosphate ester flame retardant, 6 to 15 weight percent of the surface energy reducing agent, and 10 to 30 weight percent of the mineral filler; the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof; the poly(phenylene ether) comprises a poly(2,6-dimethyl-1,4-phenylene ether) having an intrinsic viscosity of 0.36 to 0.44 deciliter per gram; the surface energy reducing agent is polytetrafluoroethylene; and the mineral filler is titanium dioxide. In some variations of this specific embodiment, the polytetrafluoroethylene is in the form of particles having a volume-based median equivalent spherical diameter of 100 nanometers to 25 micrometers determined by laser diffraction according to ISO 13320:2009. In some variations of this specific embodiment, the organophosphate ester flame retardant comprises bisphenol A bis(diphenyl phosphate). In some variations of this specific embodiment, the styrenic polymer is a hydrogenated block copolymer of an alkenyl aromatic compound and a conjugated diene. In some variations of this specific embodiment, the total amounts of the poly(phenylene ether), the organophosphate flame retardant, the surface energy reducing agent, the mineral filler, and the styrenic polymer is 95 to 100 weight percent, or 98 to 100 weight percent, or 99 to 100 weight percent, or 99.5 to 100 weight percent, based on the total weight of the pre-blended composition.

The pre-blended composition is melt-blended to form the melt-blended composition. Melt blending can be conducted, for example, on a single-screw or twin-screw extruder. An example of suitable conditions for melt-blending is included in the working examples below.

Another embodiment is an injection molded article comprising the composition in any of its embodiments described herein. The composition is useful for forming injection molded articles, including article employed in high voltage environments. The injection molded article can be, for example, a commercial appliance component (including, for example, an insulating plate for a commercial kitchen ventilator), a home appliance component (including, for example, an insulating plate for an air purifier or a kitchen ventilator or an air conditioner), a photovoltaic system component (including, for example, a photovoltaic junction box, a photovoltaic connector, a photovoltaic optimizer, a photovoltaic invertor, or a photovoltaic control box), an automotive component (including, for example, an automotive connector, or an insulation plate for an automotive air condition and air purifier). In some embodiments, the injection molded article is an insulating plate for a commercial kitchen ventilator.

In a very specific embodiment of the injection molded article, the pre-blended composition comprises 52 to 80 weight percent of the poly(phenylene ether), 10 to 18 weight percent of the organophosphate ester flame retardant, 6 to 15 weight percent of the surface energy reducing agent, and 0 to 5 weight percent of the mineral filler; the pre-blended composition further comprises 2 to 10 weight percent of a brominated polystyrene; the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof; the poly(phenylene ether) comprises a poly(2,6-dimethyl-1,4-phenylene ether) having an intrinsic viscosity of 0.36 to 0.44 deciliter per gram; and the surface energy reducing agent is polytetrafluoroethylene. In some variations of this specific embodiment, the polytetrafluoroethylene is in the form of particles having a volume-based median equivalent spherical diameter of 100 nanometers to 25 micrometers determined by laser diffraction according to ISO 13320:2009. In some variations of this specific embodiment, the organophosphate ester flame retardant comprises bisphenol A bis(diphenyl phosphate). In some variations of this specific embodiment, the styrenic polymer is a hydrogenated block copolymer of an alkenyl aromatic compound and a conjugated diene. In some variations of this specific embodiment, the total amounts of the poly(phenylene ether), the organophosphate flame retardant, the surface energy reducing agent, the mineral filler, the brominated polystyrene, and the styrenic polymer is 95 to 100 weight percent, or 98 to 100 weight percent, or 99 to 100 weight percent, or 99.5 to 100 weight percent, based on the total weight of the pre-blended composition.

Methods of and apparatus for injection molding are known in the art. An example of suitable conditions for injection molding is included in the working examples below.

All ranges disclosed herein are inclusive of the endpoints, and the endpoints are independently combinable with each other. Each range disclosed herein constitutes a disclosure of any point or sub-range lying within the disclosed range.

The invention is further illustrated by the following non-limiting examples.

Examples

Components used to form compounded compositions are summarized in Table 1.

Compositions are summarized in Table 2, where component amounts are expressed in units of weight percent based on the total weight of the composition. Compositions were compound in a Toshiba TEM-37BS twin-screw extruder operating at zone temperatures of 50° C., 150° C., 250° C., 280° C., 290° C., 290° C., 300° C., 300° C., 300° C., 290° C. (from feed throat to die), and a die temperature of 300° C. All components were added at the feed throat except for liquid flame retardant, which was added downstream using a liquid injection system. The extrudate was pelletized and dried for 4 hours at 110° C. before use for injection molding. Test articles were injection molded on a Toshiba UH1000-110 injection molding machine operating at barrel temperatures of 290° C. 300° C. 300° C. and 290° C. (from feed throat to nozzle), and a mold temperature of 75° C.

Properties of the injection molded parts are summarized in Table 2. "Contact Angle (degrees)" is the contact angle of water droplets on a planar surface of an injection-molded article, determined according to ISO 15989:2004, except that the test sample was an injection molded article rather than an extruded film. Table 2 contact angle values represent the average of values from five samples per composition. Higher values are more desirable.

"Cycles before char forming" is a measure of high voltage tracking resistance. Values were determined according to a procedure based on ASTM D3638-21. For each composition, five tensile bars were molded with dimensions according to the Type 1B bars of ISO 527-1:2019 and conditioned at 23° C. and 50% relative humidity for 40 hours. For each test cycle, a 1 percent aqueous ammonium chloride solution was sprayed onto the surface of the tensile bar, then a 12 kilovolt voltage was applied to the bar for 10 seconds with an electrode separation of 40 millimeters. The sample surface was then visually inspected to determine if any tracking mark was present. If no tracking mark was observed, additional cycles were carried out until a tracking mark was observed, with the ammonium chloride solution being reapplied between each cycle. Table 2 values represent the

TABLE 1

| Material | Description |
|---|---|
| PPE | Poly(2,6-dimethyl-1,4-phenylene ether), CAS Reg. No. 25134-01-4, having an intrinsic viscosity of 0.40 deciliter/gram measured by Ubbelohde viscometer at 25° C. in chloroform. |
| HIPS | High Impact Polystyrene (also known as rubber-modified polystyrene or styrene-butadiene copolymer), CAS Reg. No. 9003-55-8, having a polybutadiene content of 30 weight percent. |
| PS | Atactic polystyrene, CAS Reg. No. 9003-53-6, having a melt flow index of 9 grams/10 minutes, measured at 200° C. and 5 kilogram load. |
| SEBS | Polystyrene-poly(ethylene-butylene)-polystyrene triblock copolymer, CAS Reg. No. 66070-58-4, having a polystyrene content of 30 weight percent. |
| BPADP | Bisphenol A bis(diphenyl phosphate), CAS Reg. No. 5945-33-5. |
| Phosphazene | Hexaphenoxycyclotriphosphazene, CAS Reg. No. 1184-10-7. |
| Br-PS | Brominated polystyrene with an average of about 2.7 bromine atoms per phenyl ring, essentially no bromination of the aliphatic carbon atoms, and a total of about 68.5 weight percent bromine. CAS Reg. No. 88497-56-7. |
| TSAN | Poly(styrene-acrylonitrile)-encapsulated polytetrafluoroethylene, having a polytetrafluoroethylene content of about 50 weight percent. |
| PTFE | Polytetrafluoroethylene, CAS Reg. No. 9002-84-0, in particulate form having a volume-based median equivalent spherical diameter of 14 micrometers determined by laser diffraction according to ISO 13320: 2009. |
| LLDPE | Linear low-density polyethylene (ethylene-$C_4$-$C_8$-alpha-olefin copolymer), baving a melt flow index of 2 grams/10 minutes, measured at 190° C. and 2.16 kilogram load. |
| $TiO_2$ | Titanium dioxide, CAS Reg. No. 13463-67-7, surface coated with alumina; obtained as TIOXIDE ™ R-FC5 from Huntsman. |
| Additives | One or more additives selected from heat stabilizers, antioxidants, UV absorbers, and colorants. |

average of values from five samples per composition. Higher values indicate greater high voltage tracking resistance.

"UL94 V-0 thickness (mm)" is a measure of flame retardancy, with lower thickness values being more desirable. Specifically, "UL94 V-0 thickness (mm)" is the sample thickness, in millimeters, capable of yielding a value of V-0 in the 20 mm Vertical Burning Flame Test of Underwriter's Laboratory Bulletin 94 "Tests for Flammability of Plastic Materials, UL 94." Before testing, flame bars with a thicknesses of 0.5, 0.75, 1.0, 1.5, or 2.0 millimeters were conditioned at 23° C. and 50% relative humidity for at least 48 hours. A set of five flame bars was tested for each composition. For each bar, a flame was applied to the bar then removed, and the time required for the bar to self-extinguish (first afterflame time, t1) was noted. The flame was then reapplied and removed, and the time required for the bar to self-extinguish (second afterflame time, t2) and the post-flame glowing time (afterglow time, t3) were noted. To achieve a rating of V-0, the afterflame times t1 and t2 for each individual specimen must have been less than or equal to 10 seconds; the total afterflame time for all five specimens (t1 plus t2 for all five specimens) must have been less than or equal to 50 seconds; the second afterflame time plus the afterglow time for each individual specimen (t2+t3) must have been less than or equal to 30 seconds; no specimen can have flamed or glowed up to the holding clamp; and the cotton indicator cannot have been ignited by flaming particles or drops.

"Notched Izod impact strength, 23° C. (J/m)" and "Notched Izod impact strength, −40° C. (J/m)," each having units of joules per meter, were determined at the specified temperatures according to ASTM D256-10 (2018) using samples with a thickness of 3.2 millimeters. Reported values represent the average of values from five samples per composition.

"HDT at 1.82 MPa (° C.)" is heat deflection temperature under load, having units of degrees centigrade. Values were determined according to ASTM D648-18 at a flexural load of 1.82 megapascals. Reported values represent the average of values from five samples per composition.

"MFR at 300° C., 5 kg (g/10 min)" is melt flow rate, having units of grams/10 minutes. Values were determined according to ASTM D1238-20 at 300° C. and 5 kilogram load.

"Tensile modulus (MPa)" and "Tensile stress at break (MPa)," each having units of megapascals, and "Tensile strain at break (%)," having units of percent, were determined at 23° C. according to ASTM D638-14 at a sample thickness of 3.2 millimeters and a test speed of 5 millimeters per minute. Reported values represent the average of values from five samples per composition.

The property results in Table 2 demonstrate that Comparative Examples 1 and 2 exhibited "Cycles before char forming" values of 1 and 2, respectively, indicating poor high voltage tracking resistance. In contrast, Examples 1-8 exhibited "Cycles before char forming" values ranging from 10 to at least 30, indicating good high voltage tracking resistance. Examples 5-8 further exhibited excellent flame retardancy, as evidenced by UL94 V-0 ratings at 1.5 and 2.0 millimeter sample thicknesses.

TABLE 2

| | C. Ex. 1 | C. Ex. 2 | Ex. 1 | Ex. 2 | Ex. 3 |
|---|---|---|---|---|---|
| COMPOSITION | | | | | |
| PPE | 62.00 | 78.85 | 71.54 | 61.66 | 70.01 |
| HIPS | 21.40 | 0 | 0 | 0 | 0 |
| PS | 0 | 0 | 0 | 0 | 0 |
| SEBS | 0 | 4.55 | 4.00 | 4.55 | 4.55 |
| BPADP | 15.00 | 15.00 | 15.00 | 12.19 | 13.84 |
| Phosphazene | 0 | 0 | 1.00 | 0 | 0 |
| Br-PS | 0 | 0 | 0 | 0 | 0 |
| TSAN | 0 | 0 | 0.10 | 0 | 0 |
| PTFE | 0 | 0 | 8.00 | 20.00 | 10.00 |
| LLDPE | 1.24 | 1.24 | 0 | 1.24 | 1.24 |
| $TiO_2$ | 0 | 0 | 0 | 0 | 0 |
| Additives | 0.36 | 0.36 | 0.36 | 0.36 | 0.36 |
| PROPERTIES | | | | | |
| Contact Angle (degrees) | <95 | <95 | 101 | 101 | 99 |
| Cycles before char forming | 1 | 2 | 20 | 10 | 23 |
| UL94 V-0 thickness (mm) | ≥0.75 | ≥0.75 | >2.0 | >2.0 | >2.0 |
| Notched Izod impact strength, 23° C. (J/m) | 140 | 155.0 | 57.5 | 55.9 | 60.7 |
| Notched Izod strength, −40° C. (J/m) | 76 | 79.2 | 49.2 | 47.5 | 46.7 |
| HDT at 1.82 MPa (° C.) | 119.0 | 123.0 | 123.0 | 120.0 | 122.0 |
| MFR at 300° C., 5 kg (g/10 min) | 27.7 | 16.3 | 28.1 | 15.6 | 22.5 |
| Tensile modulus (MPa) | 2110.0 | 2600.0 | 2280.0 | 2048.7 | 2240.5 |
| Tensile stress at break (MPa) | 61 | 53.0 | 51.4 | 44.3 | 48.7 |
| Tensile strain at break (%) | 9 | 11.0 | 8.8 | 11.1 | 9.8 |

| | Ex. 4 | Ex. 5 | Ex. 6 | Ex. 7 | Ex. 8 |
|---|---|---|---|---|---|
| COMPOSITION | | | | | |
| PPE | 51.66 | 64.70 | 64.70 | 68.70 | 64.70 |
| HIPS | 0 | 0 | 4.00 | 0 | 0 |
| PS | 0 | 4.00 | 0 | 0 | 0 |

TABLE 2-continued

| | | | | | |
|---|---|---|---|---|---|
| SEBS | 4.55 | 0 | 0 | 4.00 | 4.00 |
| BPADP | 12.19 | 13.84 | 13.84 | 13.84 | 13.84 |
| Phosphazene | 0 | 0 | 0 | 0 | 0 |
| Br-PS | 0 | 7.00 | 7.00 | 3.00 | 7.00 |
| TSAN | 0 | 0.10 | 0.10 | 0.10 | 0.10 |
| PTFE | 10.00 | 10.00 | 10.00 | 10.00 | 10.00 |
| LLDPE | 1.24 | 0 | 0 | 0 | 0 |
| $TiO_2$ | 20.00 | 0 | 0 | 0 | 0 |
| Additives | 0.36 | 0.36 | 0.36 | 0.36 | 0.36 |
| PROPERTIES | | | | | |
| Contact Angle (degrees) | 102 | 99 | 99 | 99 | 99 |
| Cycles before char forming | >30 | 21 | 24 | 27 | 26 |
| UL94 V-0 thickness (mm) | >2.0 | ≥1.5 | ≥1.5 | ≥2.0 | ≥1.5 |
| Notched Izod impact strength, 23° C. (J/m) | 49.3 | 43.1 | 49.6 | 63.0 | 57.0 |
| Notched Izod impact strength, −40° C. (J/m) | 33.2 | 33.0 | 37.1 | 44.5 | 44.6 |
| HDT at 1.82 MPa (° C.) | 122.0 | 120.0 | 119.0 | 127.0 | 122.0 |
| MFR at 300° C., 5 kg (g/10 min) | 13.7 | 44.5 | 41.2 | 32.7 | 37.3 |
| Tensile modulus (MPa) | 2553.8 | 2333.0 | 2200.0 | 2380.0 | 2290.5 |
| Tensile stress at break (MPa) | 49.1 | 49.7 | 50.0 | 53.0 | 52.5 |
| Tensile strain at break (%) | 8.2 | 7.1 | 7.7 | 6.6 | 8.0 |

The invention includes at least the following aspects.

Aspect 1: A melt-blended composition comprising the product of melt-blending a pre-blended composition comprising, based on the total weight of the pre-blended composition: 43 to 87 weight percent of a poly(phenylene ether); 10 to 20 weight percent of an organophosphate ester flame retardant; 6 to 22 weight percent of a surface energy reducing agent selected from the group consisting of polytrifluoroethylenes, polytetrafluoroethylenes, polyhexafluoropropylenes, tetrafluoroethylene-hexafluoropropylene copolymers, poly(vinyl fluoride)s, poly(vinylidene fluoride)s, polychlorotrifluoroethylenes, polydimethylsiloxanes, silicone oils, paraffins, and combinations thereof; and 0 to 30 weight percent of mineral filler.

Aspect 2: The melt-blended composition of aspect 1, wherein the pre-blended composition further comprises 2 to 18 weight percent of a brominated flame retardant selected from the group consisting of brominated polystyrenes, brominated epoxy resins, decabromodiphenyl ether, tetrabromobisphenol A, decabromodiphenylethane, and combinations thereof.

Aspect 3: The melt-blended composition of aspect 2, wherein the brominated flame retardant is a brominated polystyrene.

Aspect 4: The melt-blended composition of any one of aspects 1-3, wherein the surface energy reducing agent is polytetrafluoroethylene.

Aspect 5: The melt-blended composition of aspect 4, wherein the polytetrafluoroethylene is in the form of particles having a volume-based median equivalent spherical diameter of 100 nanometers to 200 micrometers determined by laser diffraction according to ISO 13320:2009.

Aspect 6: The melt-blended composition of any one of aspects 1-5, wherein the organophosphate ester comprises bisphenol A bis(diphenyl phosphate).

Aspect 7: The melt-blended composition of any one of aspects 1-6, wherein the mineral filler is selected from the group consisting of talc, clay, zinc oxide, titanium dioxide, barium sulfate, calcium carbonate, zinc sulfide, and combinations thereof.

Aspect 8: The melt-blended composition of any one of aspects 1-7, wherein the pre-blended composition comprises zero to 5 weight percent of the mineral filler.

Aspect 9: The melt-blended composition of any one of aspects 1-7, wherein the pre-blended composition comprises 10 to 30 weight percent of the mineral filler, and wherein the mineral filler comprises titanium dioxide.

Aspect 10: The melt-blended composition of any one of aspects 1-9, wherein the pre-blended composition further comprises 2 to 15 weight percent of a styrenic polymer selected from the group consisting of polystyrenes, rubber-modified polystyrenes, hydrogenated block copolymers of an alkenyl aromatic compound and a conjugated diene, and combinations thereof.

Aspect 11: The melt-blended composition of aspect 1, wherein the pre-blended composition comprises 52 to 80 weight percent of the poly(phenylene ether), 10 to 18 weight percent of the organophosphate ester flame retardant. 6 to 15 weight percent of the surface energy reducing agent, and 0 to 5 weight percent of the mineral filler; wherein the pre-blended composition further comprises 2 to 10 weight percent of a brominated polystyrene; wherein the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof; wherein the poly(phenylene ether) comprises a poly(2,6-dimethyl-1,4-phenylene ether) having an intrinsic viscosity of 0.36 to 0.44 deciliter per gram, measured by Ubbelohde viscometer at 25° C. in chloroform; and wherein the surface energy reducing agent is polytetrafluoroethylene.

Aspect 12: The melt-blended composition of aspect 11, wherein the polytetrafluoroethylene is in the form of particles having a volume-based median equivalent spherical diameter of 100 nanometers to 25 micrometers determined by laser diffraction according to ISO 13320:2009.

Aspect 13: An injection molded article comprising the composition of any one of aspects 1-12.

Aspect 14: The injection molded article of aspect 13, wherein the pre-blended composition comprises 52 to 80 weight percent of the poly(phenylene ether), 10 to 18 weight percent of the organophosphate ester flame retardant. 6 to 15 weight percent of the surface energy reducing agent, and 0 to 5 weight percent of the mineral filler; wherein the pre-blended composition further comprises 2 to 10 weight percent of a brominated polystyrene; wherein the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof; wherein the poly(phenylene ether) comprises a poly(2,6-dimethyl-1,4-phenylene ether) having an intrinsic viscosity of 0.36 to 0.44 deciliter per gram, measured by Ubbelohde viscometer at 25° C. in chloroform; and wherein the surface energy reducing agent is polytetrafluoroethylene.

Aspect 15: The injection molded article of aspect 14, wherein the polytetrafluoroethylene is in the form of particles having a volume-based median equivalent spherical diameter of 100 nanometers to 25 micrometers determined by laser diffraction according to ISO 13320:2009.

The invention claimed is:

1. A melt-blended composition comprising the product of melt-blending a pre-blended composition comprising, based on the total weight of the pre-blended composition:

43 to 87 weight percent of a poly (phenylene ether);

10 to 20 weight percent of an organophosphate ester flame retardant;

6 to 22 weight percent of a surface energy reducing agent selected from the group consisting of polytrifluoroethylenes, polytetrafluoroethylenes, polyhexafluoropropylenes, tetrafluoroethylene-hexafluoropropylene copolymers, poly (vinyl fluoride) s, poly (vinylidene fluoride) s, polychlorotrifluoroethylenes, polydimethylsiloxanes, silicone oils, paraffins, and combinations thereof; and 0 to 30 weight percent of mineral filler.

2. The melt-blended composition of claim 1, wherein the organophosphate ester comprises bisphenol A bis (diphenyl phosphate).

3. The melt-blended composition of claim 1, wherein the mineral filler is selected from the group consisting of talc, clay, zinc oxide, titanium dioxide, barium sulfate, calcium carbonate, zinc sulfide, and combinations thereof.

4. The melt-blended composition of claim 1, wherein the pre-blended composition comprises zero to 5 weight percent of the mineral filler.

5. The melt-blended composition of claim 1, wherein the pre-blended composition comprises 10 to 30 weight percent of the mineral filler, and wherein the mineral filler comprises titanium dioxide.

6. The melt-blended composition of claim 1, wherein the pre-blended composition further comprises 2 to 15 weight percent of a styrenic polymer selected from the group consisting of polystyrenes, rubber-modified polystyrenes, hydrogenated block copolymers of an alkenyl aromatic compound and a conjugated diene, and combinations thereof.

7. The melt-blended composition of claim 1, wherein the pre-blended composition further comprises 2 to 18 weight percent of a brominated flame retardant selected from the group consisting of brominated polystyrenes, brominated epoxy resins, decabromodiphenyl ether, tetrabromobisphenol A, decabromodiphenylethane, and combinations thereof.

8. The melt-blended composition of claim 7, wherein the brominated flame retardant is a brominated polystyrene.

9. The melt-blended composition of claim 1, wherein the surface energy reducing agent is polytetrafluoroethylene.

10. The melt-blended composition of claim 9, wherein the polytetrafluoroethylene is in the form of particles having a volume-based median equivalent spherical diameter of 100 nanometers to 200 micrometers determined by laser diffraction according to ISO 13320:2009.

11. The melt-blended composition of claim 1, wherein the pre-blended composition comprises 52 to 80 weight percent of the poly (phenylene ether), 10 to 18 weight percent of the organophosphate ester flame retardant, 6 to 15 weight percent of the surface energy reducing agent, and 0 to 5 weight percent of tire mineral filler;

wherein the pre-blended composition further comprises 2 to 10 weight percent of a brominated polystyrene;

wherein the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof;

wherein the poly (phenylene ether) comprises a poly (2,6-dimethyl-1,4-phenylene ether) having an intrinsic viscosity of 0.36 to 0.44 deciliter per gram, measured by Ubbelohde viscometer at 25° C. in chloroform; and wherein the surface energy reducing agent is polytetrafluoroethylene.

12. The melt-blended composition of claim 11, wherein the polytetrafluoroethylene is in the form of particles having a volume-based median equivalent spherical diameter of 100 nanometers to 25 micrometers determined by laser diffraction according to ISO 13320:2009.

13. An injection molded article comprising the composition of claim 1.

14. The injection molded article of claim 13, wherein the pre-blended composition comprises 52 to 80 weight percent of the poly (phenylene ether), 10 to 18 weight percent of the organophosphate ester flame retardant, 6 to 15 weight percent of the surface energy reducing agent, and 0 to 5 weight percent of the mineral filler;

wherein the pre-blended composition further comprises 2 to 10 weight percent of a brominated polystyrene;

wherein the pre-blended composition further comprises 2 to 10 weight percent of a styrenic polymer selected from the group consisting of polystyrenes, rubber-modified polystyrenes, hydrogenated block copolymers of an alkenyl aromatic compound and a conjugated diene, and combinations thereof;

wherein the poly (phenylene ether) comprises a poly (2,6-dimethyl-1,4-phenylene ether) having an intrinsic viscosity of 0.36 to 0.44 deciliter per gram, measured by Ubbelohde viscometer at 25° C. in chloroform; and wherein the surface energy reducing agent is polytetrafluoroethylene.

15. The injection molded article of claim 14, wherein the polytetrafluoroethylene is in the form of particles having a volume-based median equivalent spherical diameter of 100 nanometers to 25 micrometers determined by laser diffraction according to ISO 13320:2009.

* * * * *